Figure 1:
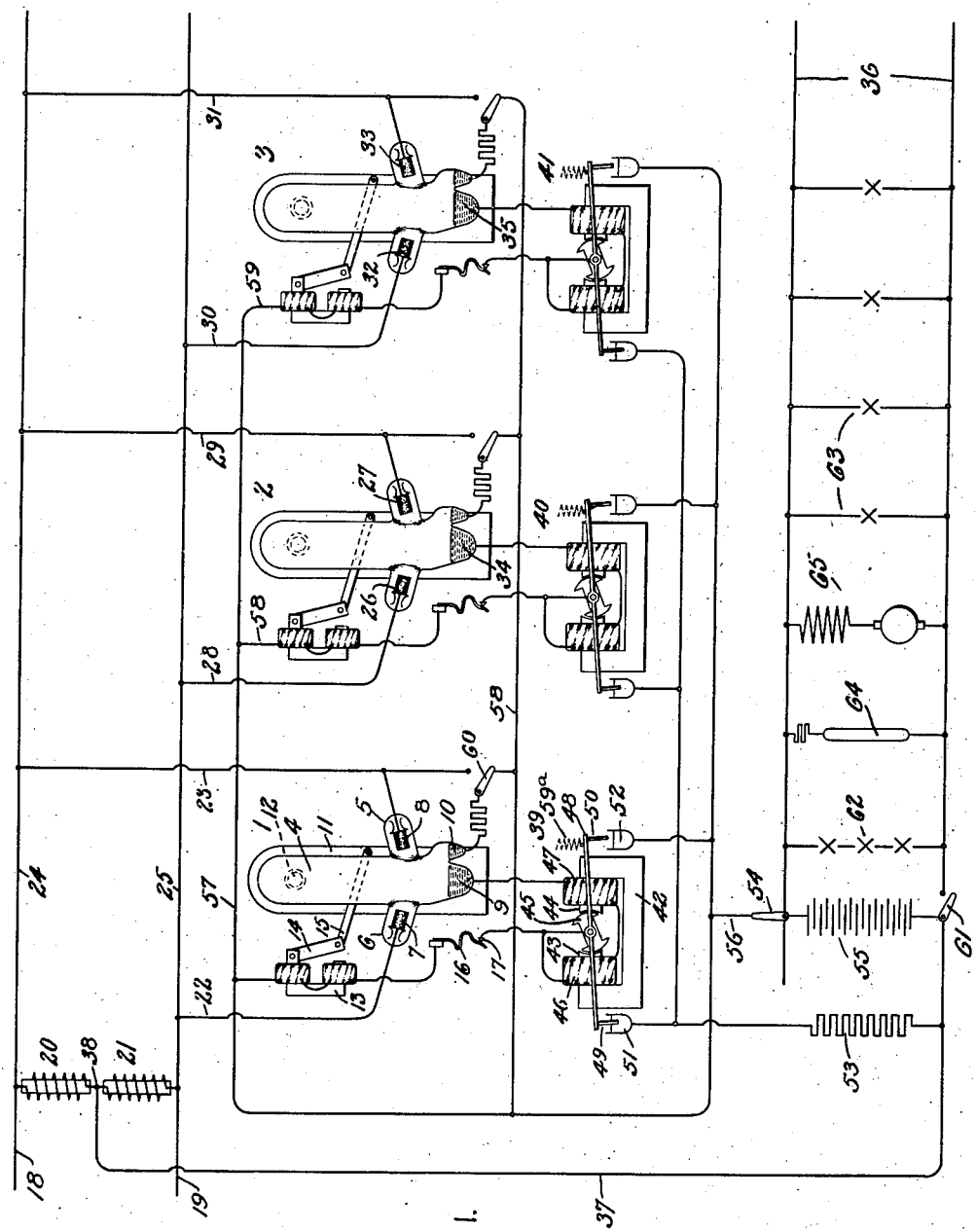

S. FERGUSON.
VAPOR ELECTRIC APPARATUS.
APPLICATION FILED MAY 14, 1904.

1,072,443.

Patented Sept. 9, 1913.
2 SHEETS—SHEET 1.

WITNESSES:
George A. Thornton
Helen Oxford

INVENTOR:
Samuel Ferguson,
By Albert S. Davis
Atty.

S. FERGUSON.
VAPOR ELECTRIC APPARATUS.
APPLICATION FILED MAY 14, 1904.
1,072,443.
Patented Sept. 9, 1913.
2 SHEETS—SHEET 2.
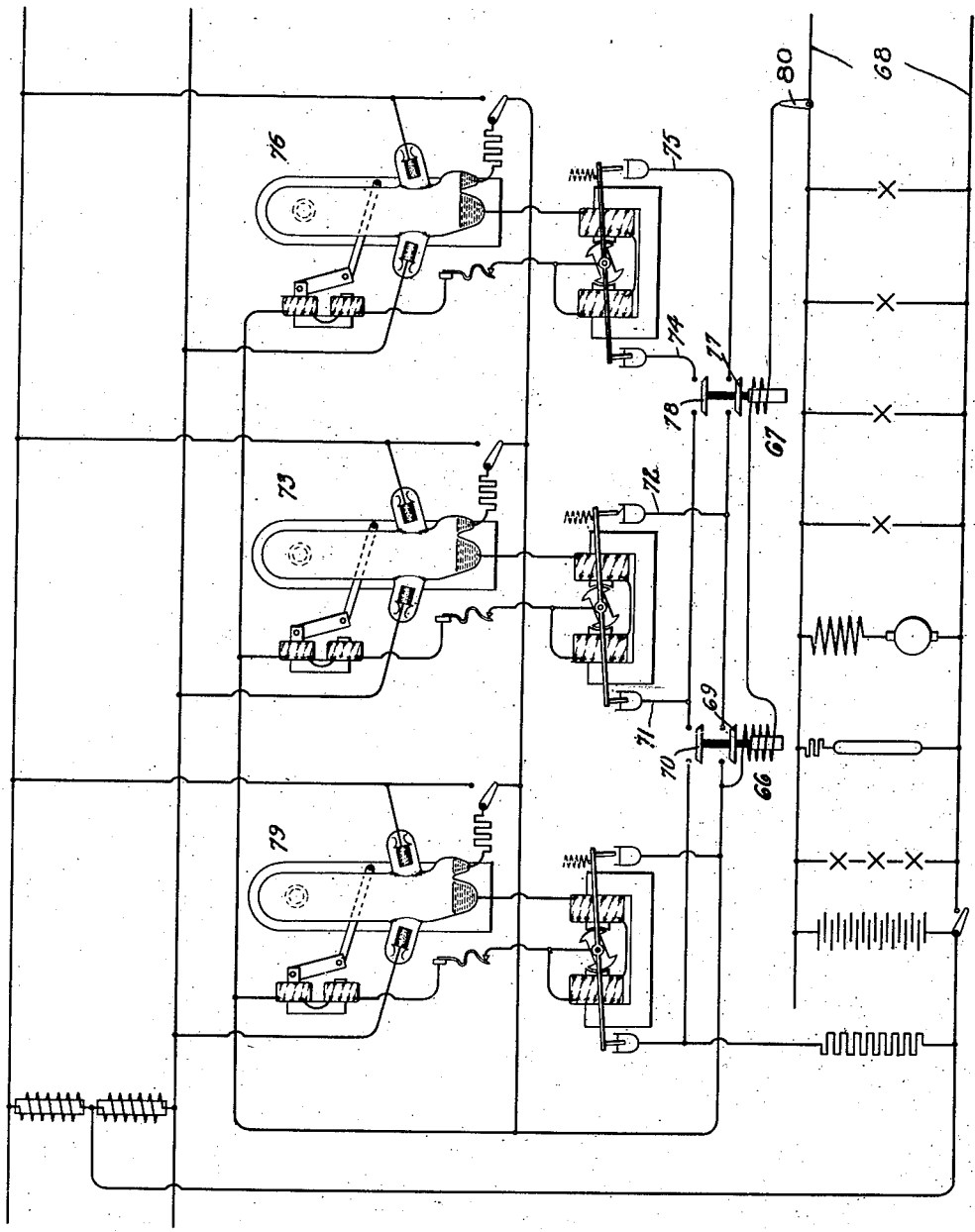

UNITED STATES PATENT OFFICE.

SAMUEL FERGUSON, OF SCHENECTADY, NEW YORK, ASSIGNOR TO GENERAL ELECTRIC COMPANY, A CORPORATION OF NEW YORK.

VAPOR ELECTRIC APPARATUS.

1,072,443.  Specification of Letters Patent.  Patented Sept. 9, 1913.

Application filed May 14, 1904. Serial No. 207,954.

*To all whom it may concern:*

Be it known that I, SAMUEL FERGUSON, a citizen of the United States, residing at Schenectady, county of Schenectady, State of New York, have invented certain new and useful Improvements in Vapor Electric Apparatus, of which the following is a specification.

My present invention relates to vapor electric devices, such as rectifiers or the like, and is embodied in an organization wherein the rectifiers or similar devices may be operated in multiple with each other.

One of the features of my invention contemplates the use of a number of rectifiers for supplying a common load and embodies arrangements whereby, as the load varies, the number of rectifiers in circuit may be increased or diminished to correspond with the increase or decrease of load. This result I accomplished automatically and thus conveniently provide for the use at any one time of only as many rectifiers as may be necessary to take care of the load. The rectifier capacity which is not required to supply the load thus remains unenergized. I thus secure a higher efficiency of operation of the system than would be the case if all the rectifiers of the system were in use all of the time.

The features of novelty characteristic of the invention I have pointed out with particularity in the appended claims. The invention itself, however, will be better understood by reference to the following description taken in connection with the accompanying drawings, in which—

Figure 1 represents an embodiment of my invention in which rectifiers are operated in multiple with each other and in which the reactance of the controlling device which I employ for each rectifier is utilized as the steadying reactance for securing multiple operation of the rectifiers; and Fig. 2 represents a system similar in many respects to that shown in Fig. 1 but provided with means whereby only so many rectifiers are maintained in a circuit at any one time as may be necessary to supply the load then on the system.

Various types of vapor electric devices may be used in embodiments of my invention. The particular type which I show by way of illustration is a now well known form of rectifier. Referring to Fig. 1, three of these rectifiers are indicated at 1, 2 and 3. The rectifier proper, in the case of the rectifier 1, includes an exhausted container or envelop 4. This container may be a vertically positioned tube of glass provided with lateral extensions 5 and 6 which are slightly inclined. These extensions contain electrodes 7 and 8 of artificial graphite or other suitable material. In the bottom of the container two pockets are formed. The centrally located and relatively large pocket holds a body of mercury 9 which constitutes one of the main electrodes coöperating with the graphite electrodes 5 and 6. Beside the mercury electrode 9, in the adjacent pocket is a body of mercury 10 constituting a starting electrode. Suitable leading-in conductors are provided for all of the electrodes whereby current may be conveyed to or from the respective electrodes through the walls of the container or envelop.

The rectifier proper, as thus described, is mounted upon a support 11 pivoted at some suitable point as indicated at 12. A magnet 13 having a pivoted armature 14 operates, when energized, to oscillate the rectifier 1 by means of a link 15 pivoted at one end to the armature and at the other end to the support 11. This magnet, when energized in a manner hereinafter to be described, swings the pivoted rectifier to the left until some portion of the same comes up against a spring 16 which normally presses against a fixed contact 17 and holds the circuit of the magnet closed. As soon as engagement with the spring takes place the circuit of the magnet is opened and the rectifier swings back only again to be attracted as soon as the spring 16 again closes the circuit of the magnet 13. The return movement of the rectifier may be assisted by a spring if so desired.

The details of the oscillating mechanism for the rectifiers, while of my invention, are not herein set forth other than in a somewhat diagrammatic manner, since the same furnishes the subject matter of an application Serial No. 165,201, heretofore filed by me. The foregoing description, however, is sufficient to enable one skilled in the art to understand my present invention.

The rectifiers 2 and 3 are merely duplicates of the rectifier 1 though, of course, if desired they may differ in size or in minor details. No special description, however, of these rectifiers is necessary other than that above given.

The rectifiers are supplied with current derived from an alternating current source over the incoming leads 18 and 19. Across these leads there are connected in series two inductance coils 20 and 21 the function of which is to store energy at appropriate times and discharge the same through the circuits of the indivdual rectifiers so that, in conjunction with current flowing directly from the mains 18 and 19, no interruption takes place in the flow of current in the rectifiers. Without these inductance coils, or some similar alternative arrangement, the current in the rectifiers, ceasing to flow when the current in the supply mains passed through zero, would not again start up. The electrodes 5 and 6, which in this case operate as positive electrodes or anodes, are connected by suitable leads 22 and 23 to the mains 24 and 25 extending from the inductance coils 20 and 21. In a similar manner the corresponding anodes 26 and 27 of the rectifier 2 are connected by leads 28 and 29 to the same mains. Leads 30 and 31 connect the anodes 32 and 33 of the remaining rectifier 3 to the same mains 24 and 25.

The main mercury electrodes or cathodes 9, 34 and 35 are arranged so that when in normal operation current will flow therefrom through a work circuit 36 to the return conductor 37 extending to the junction 38 between the inductance coils 20 and 21.

In order to start the rectifiers each of them is provided with a controlling device indicated, in the case of the rectifier 1, at 39, and in the case of the other two rectifiers at 40 and 41. These controlling devices are all alike so a description of one will suffice for all. The controlling device 39 consists of a core 42, preferably laminated, having pole-pieces 43 and 44 between which a partially rotatable armature 45 of magnetic material is positioned. Coils 46 and 47 in series with each other are located so as to energize the core. These coils are connected directly in circuit with the cathode 9 and have one of their terminals connected to a switch arm 48. This switch arm carries two contacts 49 and 50, the first adapted to engage a mercury cup 51 and the second a mercury cup 52. The mercury cup 51 is connected to one end of a starting resistance 53, the opposite end of which is joined to the lead 37. The other mercury cup 52 is adapted to be connected through a switch 54 with the positive terminal of a storage battery 55, the negative terminal of which is likewise connected to the lead 37. This storage battery I use, not only for energizing the oscillating or shaker magnet 13, but also for producing the starting arc in the rectifier between the starting electrode 10 and the main cathode 9. After these operations have been performed the battery may be charged by the rectifiers or cut out of circuit as desired.

In order that current from the battery may be used to energize the oscillator magnet 13 the lead 56 is connected to the main 57 from which branches one lead of the magnet 13 and also the leads 58 and 59 of the oscillator magnets of the other two rectifiers. The fixed terminal 17 of the switch of the magnet circuit is electrically connected to the switch arm 48 as indicated.

When the controlling device 39 is in the starting position the arm 48 occupies a position in which the contact 49 engages the mercury cup 51. In this position it will be seen that current may flow from the battery 55 through the lead 56 to the main 57, through the magnet 13 to the mercury cup 51, and then through the starting resistance 53 to the opposite pole to the battery 55.

The magnet 13, being thus energized, oscillates the rectifier 1. In doing so it causes mercury to slop over the barrier between the electrodes 9 and 10 and thereby causes a momentary electrical connection between the same. On the formation of this electrical connection current may flow from the battery 55, through the lead 56 to the main 58, thence from electrode 10 to electrode 9, back through the coils 47 and 46 to the mercury cup 51, and thence through the resistance 53 to the opposite pole of the battery. As soon as the momentarily existing bridge of mercury between the electrodes 9 and 10 breaks, an arc or flow of current is produced which energizes the surface of the electrode 9 and causes the latter to give off ionized or conducting vapor. The existence of this vapor is all that is necessary to start the flow of current from the mains 24 and 25 to the anodes 5 and 6 from which the current flows unidirectionally through the rectifier and through the coils of the controlling device 39 to the resistance 53 and back to the junction point 38 between the inductance coils 20 and 21. This mode of operation forms no portion of the present invention and, being well understood in the art, requires no further description. As soon as this flow of current takes place the armature 45 is rotated under the influence of the coils 46 and 47 so as to lift the contact 49 out of the mercury cup 51 and to dip the other contact 50 into the mercury cup 52. This, as will be seen, cuts out the magnet 13 and causes the oscillation of the rectifier to cease. Should current stop flowing through the rectifier, for any cause, the spring 59ª or other suitable means causes a reverse movement of the lever 48 and a corresponding change of the connections from the running position to the starting position.

The other rectifiers 2 and 3 are operated in the same manner as that described in connection with rectifier 1. When all of the rectifiers are in operation, which result I accomplish practically simultaneously, each rectifier it will be seen furnishes rectified current which traverses the coils of the corresponding controlling device. These devices, containing as they do a large amount of iron, constitute good inductance coils and permit the omission of the inductance coils which it has heretofore been necessary to connect in series with the direct current circuits of multiple connected rectifiers, that they may be caused to operate properly together. The controlling devices 39, 40, 41, serve the purpose of enabling the rectifiers to work together in multiple, starting them up when they are to be used, and controlling their operation when in use.

I have described the battery 55 as being used for the purpose of producing the starting arc in the rectifiers. If desired, however, I may, by throwing the switch 60, derive current for this purpose from the lead 23. It is preferable, however, to use the battery since the proper direction of current flow is obtained instantly and the rectifier thus starts with more certainty upon a single shake or oscillation. After the rectifiers have been started they may be switched to the load by closing switch 61. The battery 55 by a switch not shown, may, of course, be cut out, as indeed may any of the translating devices indicated diagrammatically in position between the leads of the work circuit 36. The translating device indicated comprises lights 62 and 63, a vapor lamp 64, and a motor 65.

In the system shown in Fig. 1 all of the rectifiers are used simultaneously. I find it desirable in many cases to use only as many rectifiers as may be necessary to supply the load. To this end I provide automatic means for proportioning the number of rectifiers in use to the load supplied. An organization for effecting this result is shown in Fig. 2, which is practically the same as the diagram in Fig. 1 except with the addition of the automatic switches 66 and 67. These switches are in series with each other and with the lead extending to the work circuit 68. The switch 66 is provided with contacts 69 and 70 which when open cut out the starting circuit 71 and the running circuit 72 of the rectifier 73, corresponding to the rectifier 2 in Fig. 1, and also at the same time cuts out the starting and running circuits 74 and 75 of the rectifier 76. The switch 67 is also provided with contacts, as 77 and 78, which control the starting and running circuits 74 and 75 of the rectifier 76.

The switch 66 is adjusted so that it closes its contacts when current supplied to the work circuit is equal to or in excess of that of the capacity of the rectifier 79. When this current is reached the two rectifiers 79 and 73 operate together. When the work circuit current becomes greater than the capacity of these two rectifiers, the switch 67 throws in the rectifier 76, which it does by closing the starting and running circuits. The rectifiers when cut into circuit by their respective switches 66 and 67, of course, start automatically as above described. Upon a decrease in load the reverse action takes place so at no one time are there in circuit a greater number of rectifiers than are necessary to take care of the load at that time. If the load is taken entirely off, as by the switch 80, the rectifiers are automatically cut out.

It will be evident to one skilled in the art that numerous changes may be made in the embodiments of my invention without departing from the spirit thereof, for which reason I do not wish to be limited to the exact details shown and described.

What I claim as new, and desire to secure by Letters Patent of the United States, is,—

1. The combination of an alternating current system, a plurality of rectifiers for converting alternating current into direct current, a direct current circuit, a plurality of electromagnet devices in the direct current circuit connected in series and responsive to successively varying values of the direct current, for varying the number of rectifiers in circuit and means operative when said rectifiers are in circuit to start the same.

2. The combination of an alternating current system, a plurality of vapor electric rectifying devices adapted to rectify current from said system, a load circuit supplied by said rectifiers, electrical means for varying the number of rectifiers in circuit, and means operating, when a rectifier is thrown in circuit, to produce a starting arc therein.

3. The combination of a plurality of vapor electric devices adapted to operate in multiple on an alternating current circuit, automatic means for varying the number of devices in circuit, and means operating when a device is thrown in circuit to produce a starting arc therein.

4. In a system of distribution, the combination of alternating current supply mains, a variable load circuit, a plurality of vapor electric rectifying devices for converting alternating current from said mains into direct current and feeding it to said load circuit, and means responsive to direct current flowing to said load circuit for varying the number of rectifiers in circuit.

5. In a system of distribution, the combination of alternating current supply mains, a variable load circuit, a plurality of vapor electric rectifying devices for converting alternating current from said mains into direct current and feeding it to said load circuit, and automatic means responsive to direct current fed to said load circuit for varying the number of rectifiers in multiple.

6. In a system of distribution, the combination of alternating current supply mains, a variable load circuit, a plurality of vapor electric rectifying devices for converting alternating current from said mains into direct current and feeding it to said load circuit, automatic starting devices for said rectifiers, and means responsive to direct current flowing to said load circuit for varying the number of rectifiers in operation.

7. The combination with a source of alternating current, a plurality of mercury vapor rectifiers fed from said source, a common direct current work circuit fed by said rectifiers, with means whereby the increase of current beyond the predetermined minimum in one rectifier connects the direct current electrode of another to the work circuit, said means being located in the lead from the direct current electrode of the first named converter.

In witness whereof I have hereunto set my hand this 13th day of May, 1904.

SAMUEL FERGUSON.

Witnesses:
BENJAMIN B. HULL,
HELEN ORFORD.